US009214739B2

(12) United States Patent
Sover et al.

(10) Patent No.: US 9,214,739 B2
(45) Date of Patent: Dec. 15, 2015

(54) OVERLAPPED AND STAGGERED ANTENNA ARRAYS

(75) Inventors: Ra'anan Sover, Haifa (IL); Itsik Refaeli, Modiin M. (IL)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 13/993,084

(22) PCT Filed: Sep. 8, 2011

(86) PCT No.: PCT/US2011/050855
§ 371 (c)(1),
(2), (4) Date: Jun. 11, 2013

(87) PCT Pub. No.: WO2013/036231
PCT Pub. Date: Mar. 14, 2013

(65) Prior Publication Data
US 2013/0273858 A1 Oct. 17, 2013

(51) Int. Cl.
*H04M 1/00* (2006.01)
*H01Q 21/06* (2006.01)
*H01Q 1/22* (2006.01)
*H01Q 15/08* (2006.01)
*H01Q 19/06* (2006.01)

(52) U.S. Cl.
CPC ........... *H01Q 21/061* (2013.01); *H01Q 1/2266* (2013.01); *H01Q 15/08* (2013.01); *H01Q 19/062* (2013.01); *H01Q 21/064* (2013.01); *H01Q 21/065* (2013.01); *H01Q 21/067* (2013.01)

(58) Field of Classification Search
CPC ... H01Q 3/30; H01Q 21/0087; H01Q 21/065; H01Q 13/106
USPC .................. 455/13.1, 19, 25, 63.4, 82, 562.1, 455/575.7; 343/770, 810
See application file for complete search history.

(56) References Cited

U.S. PATENT DOCUMENTS 4,872,019 A 10/1989 Chow et al.
5,115,245 A * 5/1992 Wen et al. .................... 342/175
(Continued)

FOREIGN PATENT DOCUMENTS

CN 1139144 C 2/2004
CN 1539213 A 10/2004
(Continued)

OTHER PUBLICATIONS

International Search Report and Written Opinion received for PCT Patent Application No. PCT/US2011/050855, mailed on Mar. 22, 2012, 10 pages.
(Continued)

*Primary Examiner* — Sonny Trinh
(74) *Attorney, Agent, or Firm* — Forefront IP Lawgroup, PLLC

(57) ABSTRACT

An antenna structure includes a dielectric material in which antenna array elements are placed on either side. Elements on either side of the dielectric material overlap or are staggered opposing elements. The dielectric material may also include co-located, antenna arrays of array elements radiating in different directions. Antenna array elements may be formed using conformal shielding which applied and selectively removed to create antenna structures. Devices that include the antenna structure can include a casing that is a shaped lens to increase antenna aperture size and enhance antenna performance.

22 Claims, 8 Drawing Sheets

(56) References Cited

U.S. PATENT DOCUMENTS

| | | | | |
|---|---|---|---|---|
| 5,220,335 | A | 6/1993 | Huang et al. | |
| 5,600,337 | A * | 2/1997 | Cassel | 343/770 |
| 6,456,242 | B1 | 9/2002 | Crawford | |
| 7,855,690 | B2 * | 12/2010 | Hook et al. | 343/754 |
| 8,269,687 | B2 * | 9/2012 | Lindmark et al. | 343/810 |
| 8,643,554 | B1 * | 2/2014 | Manry et al. | 343/705 |
| 2004/0252060 | A1 | 12/2004 | Matsubara et al. | |
| 2009/0160718 | A1 | 6/2009 | Yen et al. | |
| 2009/0195471 | A1 * | 8/2009 | Semonov | 343/810 |
| 2010/0177012 | A1 | 7/2010 | Morrow et al. | |

FOREIGN PATENT DOCUMENTS

| | | | |
|---|---|---|---|
| CN | 1601923 | A | 3/2005 |
| EP | 0 432 647 | A2 | 6/1991 |
| JP | 2001-077739 | A | 3/2001 |
| JP | 2006-501759 | A | 1/2006 |
| JP | 2006-067376 | A | 3/2006 |
| JP | 2009-089217 | A | 4/2009 |
| JP | 2010-520721 | A | 6/2010 |
| JP | 2011-517394 | A | 6/2011 |
| KR | 2003-0035854 | A | 5/2003 |
| KR | 10-2005-0089542 | A | 9/2005 |
| KR | 2009-0081415 | A | 7/2009 |
| KR | 10-2010-0035396 | A | 4/2010 |
| KR | 10-2011-0005452 | A | 1/2011 |
| KR | 10-1035176 | B1 | 5/2011 |
| WO | 99/17397 | A1 | 4/1999 |
| WO | 2004/032371 | A1 | 4/2004 |
| WO | 2004/057699 | A1 | 7/2004 |
| WO | 2008/109574 | A1 | 9/2008 |
| WO | 2009/114486 | A2 | 9/2009 |
| WO | 2013/036231 | A1 | 3/2013 |

OTHER PUBLICATIONS

International Preliminary Report on Patentability with Written Opinion received for PCT Patent Application No. PCT/US2011/050855, mailed on Mar. 20, 2014, 7 Pages.

Extended European Search Report received for European Patent Application No. 11871913.7, mailed on Mar. 27, 2015, 8 pages.

Office Action received for Chinese Patent Application No. 201180073363.2, mailed on Nov. 3, 2014, 15 pages of English Translation and 9 page of Chinese Office Action.

Office Action received for Korean Patent Application No. 2014-7008350, mailed on Mar. 23, 2015, 4 pages of English Translation and 6 pages of Korean Office Action.

Office Action received for Chinese Patent Application No. 201180073363.2, mailed on Jul. 20, 2015, 14 pages of English Translation and 9 pages of Chinese Office Action.

Office Action received for Japanese Patent Application No. 2014-529650, mailed on Jun. 23, 2015, 6 pages of English Translation and 8 page of Japanese Office Action.

* cited by examiner

OVERLAPPED AND STAGGERED ANTENNA ARRAYS

BACKGROUND

Evolving transmission specifications, such as the Wireless Gigabit Alliance (WGA) or WiGig specification will be implemented on various transmitting devices. The WiGig specification is defined by the Institute of Electrical and Electronics Engineers (IEEE) 802.11ad specification. In particular, antenna and antenna arrays used on various devious will implement such specifications. Devices using one or more antenna arrays may transmit using WiGig radios operating in the 60 GHz frequency spectrum (also known as "DBand") as defined by the WiGig specification.

Antenna arrays may be connected to separate transmit and receive chains, or a combination transmit and receive switch. Antenna arrays may include a number of elements, and antenna array elements may be arranged to form a one or two dimensional array. Antenna arrays may be designed to radiate or transmit radio waves perpendicular to array orientation (e.g., radiating in the z-axis to an antenna array arranged in the y-axis, or radiating in the z-axis to a planar antenna array arranged in the x-y plane). Such radiation is referred to as broadside radiation. In certain implementations, an antenna array may be designed to radiate or transmit radio waves in the same directions as the array orientation (e.g., radiating in the y-axis to an antenna array arranged in the y-axis, or radiating on the x-y plane to planar antenna array arranged in the x-y plane). Such radiation is referred to as end fire radiation.

Regardless of whatever specification(s) may be implemented on a device, such as the WiGig specification, challenges arise as to minimizing the space in which antenna arrays take up in the device, minimizing lossy power transmission from various power sources of the device to the antenna arrays, and generally providing effective transmission from the antenna arrays on the device to receiving devices/stations/etc.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
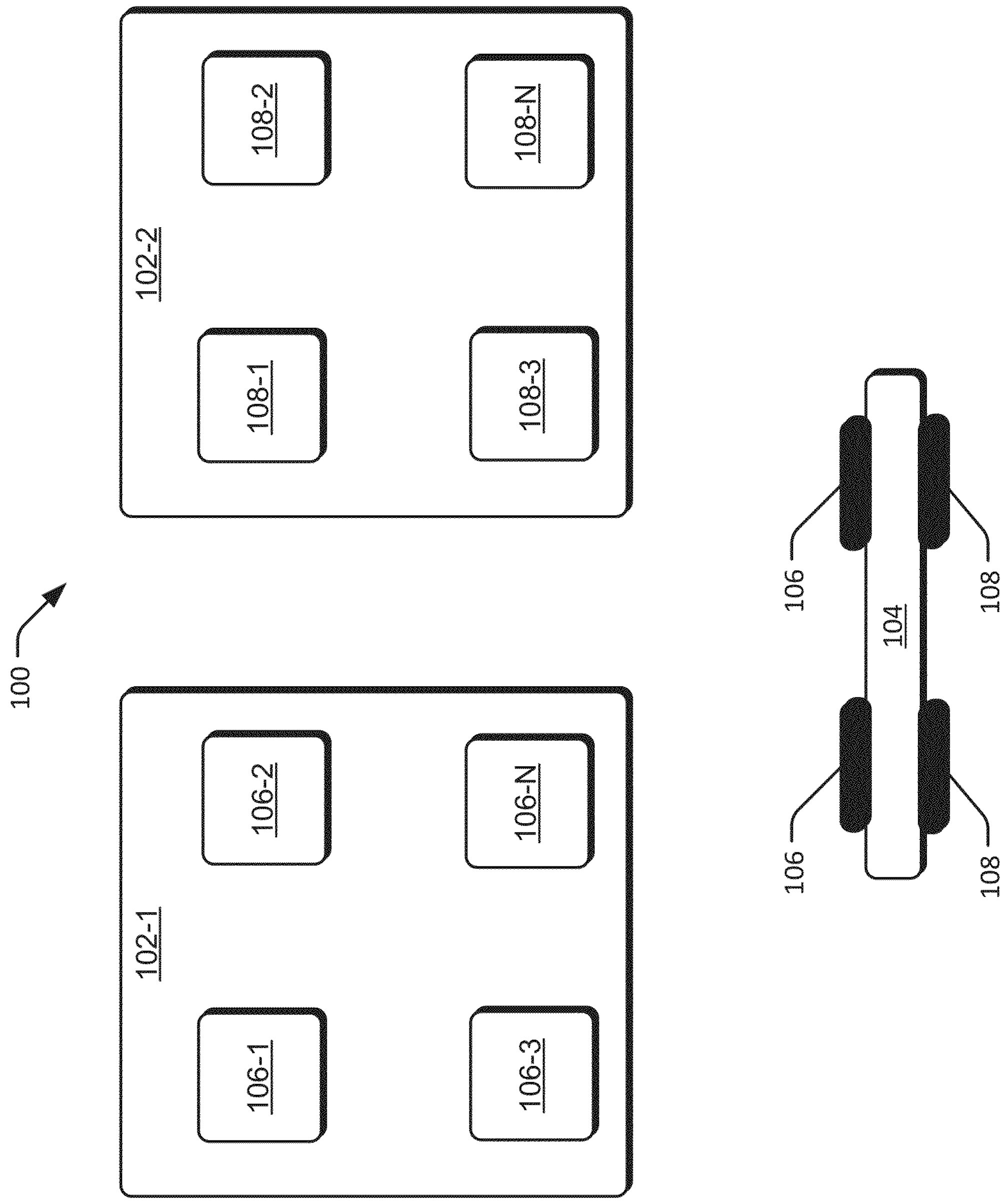
FIG. 1 is a diagram of an example dielectric with overlapping antenna array elements.

Described herein are architectures, platforms and methods that provide overlapped and staggered transmit and receive antenna arrays on a wireless device. Certain implementations provide for dielectric material on which the antenna arrays are placed on either side of the dielectric material. In certain implementations, antenna arrays or array elements radiating in different directions are co-located on the same board or module. In certain implementations, conformal shielding is applied and removed to create antenna structures. In certain embodiments, a device uses a casing as a shaped lens to increase antenna aperture size and enhance antenna performance.

Unless specifically stated otherwise, as apparent from the following discussions, it is appreciated that throughout this document, discussions utilizing terms such as "processing", "computing", "calculating", "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: Wireless LAN Medium Access Control (MAC)

and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth® Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

The described antennas and antenna arrays may conform to the WiGig specification, operating at 60 GHz spectrum. The described antennas and antenna arrays may be beam steerable, or directed beam antennas or antenna arrays. Such antennas and antenna arrays may be planar, three dimensional, or other configurations, as realized by those skilled in the art. In addition, the described antennas and antenna arrays may provide for broadside and/or end fire radiation.

Overlapped and Staggered Antenna Arrays

FIG. 1 shows a schematic illustration of an example structure 100 for separate overlap antenna arrays. On one side 102-1, and another side 102-2 of a material or dielectric material 104, are antenna arrays, each having a plurality of antenna array elements 106 and 108. Typical antenna array structures may be implemented on the same plane; however, in order to minimize space, both sides of the material 104 incorporate antenna arrays. In this embodiment, the antenna array elements overlap one another. As illustrated in FIG. 1, this overlap is seen as elements 106 being directly over elements 108.

As discussed further below, the antenna arrays may be implemented as a separate transmit or Tx chain, and as a separate receive or Rx chain. Typical antenna arrays may be used to both transmit and receive radio waves. However, such arrays make use of a Tx/Rx switch that may introduce lossy power and sensitivity in Tx and Rx chain lineups. In other words, if each antenna element is used as an antenna element in a transceiver, then a Tx/Rx switch is needed to separately route the Tx signal and the Rx signal towards the antenna element. This Tx/Rx switch has an associated "insertion loss" which is rolled up in both the Tx and Rx chain lineups. Ultimately this loss decreases Tx output power and decreases Rx sensitivity. By implementing separate Tx and Rx antenna chains and arrays, such loss as to power and sensitivity may be reduced or eliminated.

In antenna arrays, elements should be separated by the derived approximate value "wavelength of the radio wave divided by two" or $\lambda/2$. Antenna elements are separated by $\lambda/2$ from one another for optimal antenna array performance. Implementation using the WiGig specification makes use of the 60 GHz spectrum. Therefore, the wavelength $\lambda$ of the radio waves in the 60 GHz translates to 5 mm. The spacing, $\lambda/2$, translates to 2.5 mm between array elements. In general, the overall area of the array is a function of the number of elements in the X and Y directions multiplied by $\lambda/2$. By implementing WiGig, the antenna arrays may be significantly smaller than antenna arrays operating at lower frequencies.

Figure 2:
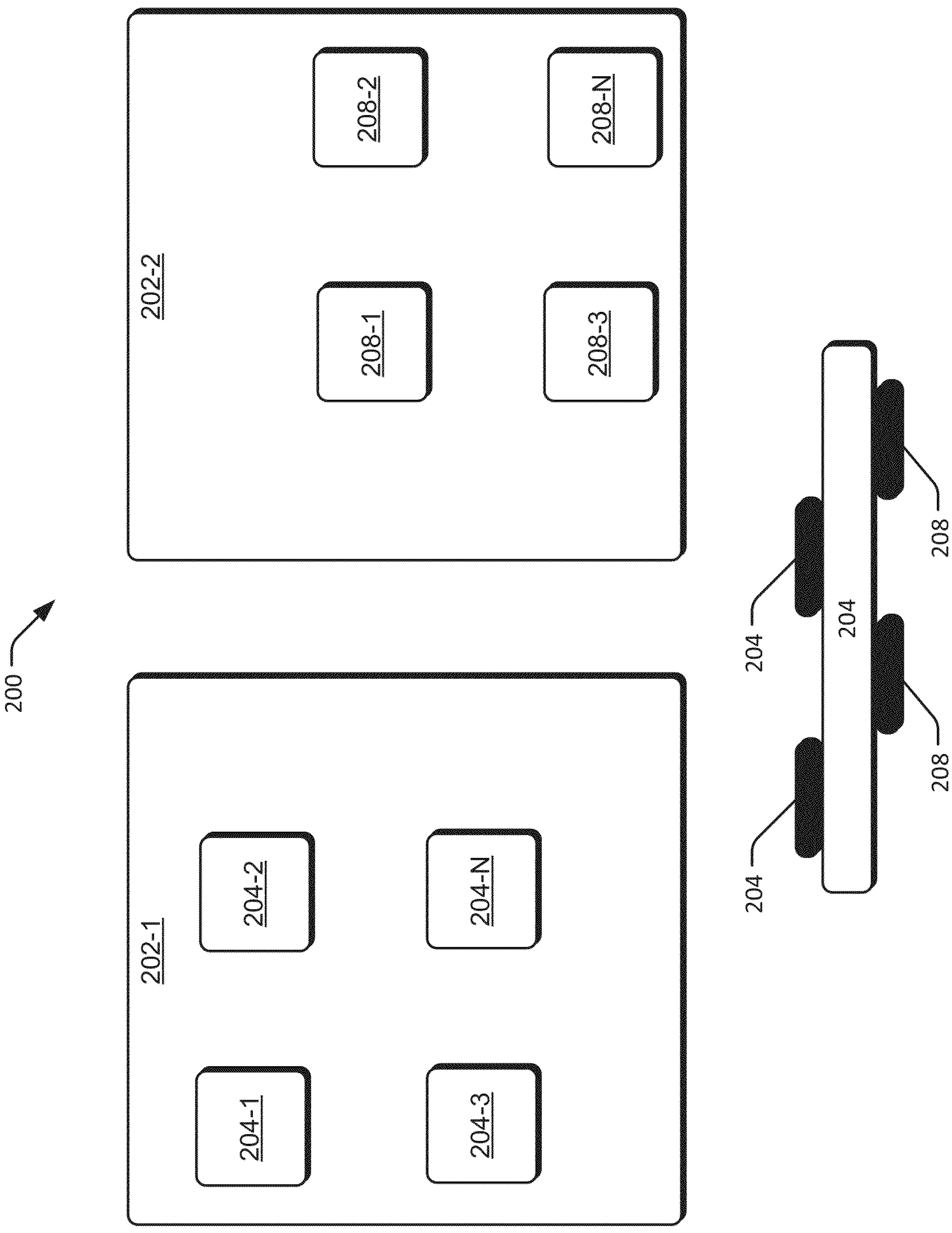
FIG. 2 is a diagram of an example dielectric with staggered antenna array elements.

FIG. 2 shows a schematic illustration of an example structure 200 for separate staggered antenna arrays. On one side 202-1, and another side 202-2 of a material or dielectric material 204, are antenna arrays, each having a plurality of antenna array elements 206 and 208. In this embodiment, the antenna array elements are staggered over one another. As illustrated in FIG. 2, this stagger is seen as elements 206 staggered or spaced over elements 208. The elements of one array may be slightly staggered or offset in the X-Y direction from those of the other array so that the overall area is slightly larger than the area of a single antenna array. The staggering is particularly implemented to address potential interference of antenna array elements, as defined by the separation equation $\lambda/2$.

Considerations may be made as to boundary conditions of the dielectric material (e.g., dielectric material 104 and 204), including thickness of the material. In particular, consideration may be made as to the operation of antenna elements with one another. Furthermore, directionality differences of the radiation pattern of the two arrays may be considered, since the arrays are considered three dimensional (3D) and elements of one array could act as reflectors or directors to the other array.

As appreciated by those skilled in the art, the antenna arrays can be arranged in various formations, including to, but not limited to linear, hexagon, star, ring, etc. Furthermore, the antenna arrays may be two or three dimensional.

Figure 3:
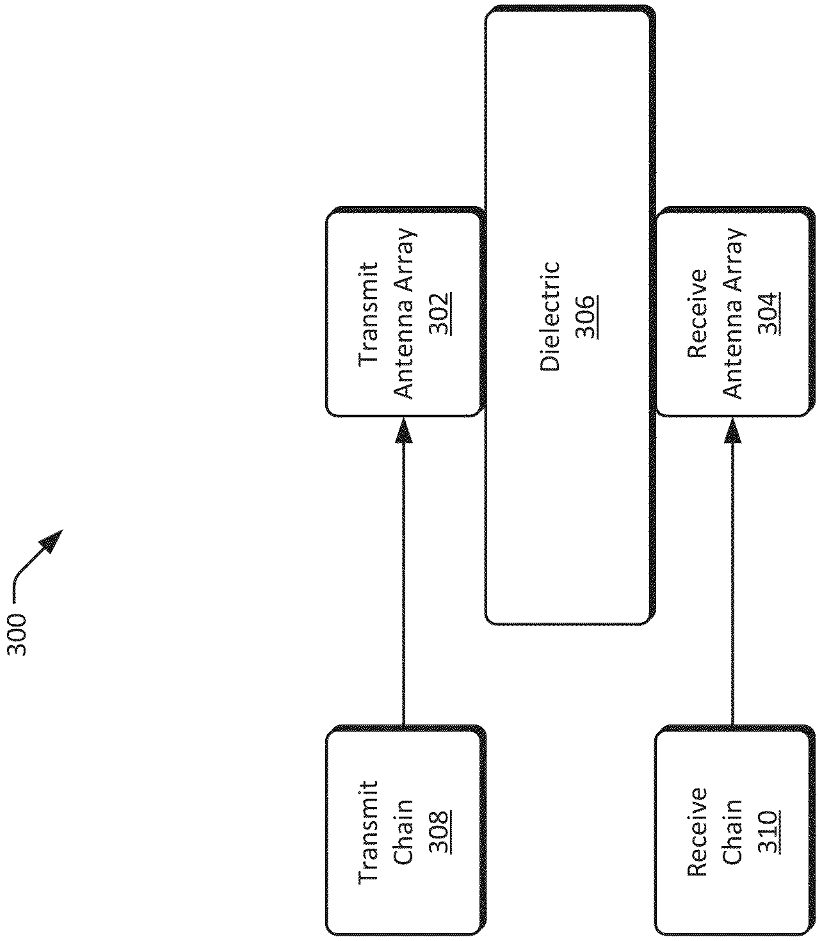
FIG. 3 is a diagram of an example architecture for separate transmit antenna chain and array, and receive antenna chain and array.

FIG. 3 shows a schematic illustration of an architecture 300 for separate transmit antenna array 302 and receive antenna array 304. As discussed above, single antenna arrays which transmit and receive, make use of a Tx/Rx switch that may introduce lossy power and sensitivity in Tx and Rx chain lineups. To address this, the separate transmit antenna array 302 is placed on one side of a dielectric material 306, and the separate receive antenna array 304 is placed on the other side of the dielectric 306. A separate transmit chain 308 controls the transmit antenna array 302, and a separate receive chain 310 controls the receive antenna array 304. It is to be understood by those skilled in the art, that routing from the chains 308 and 310 to the antenna arrays 302 and 304, and respective antenna array elements may make use of efficient (e.g., shortest) routes.

Figure 4:
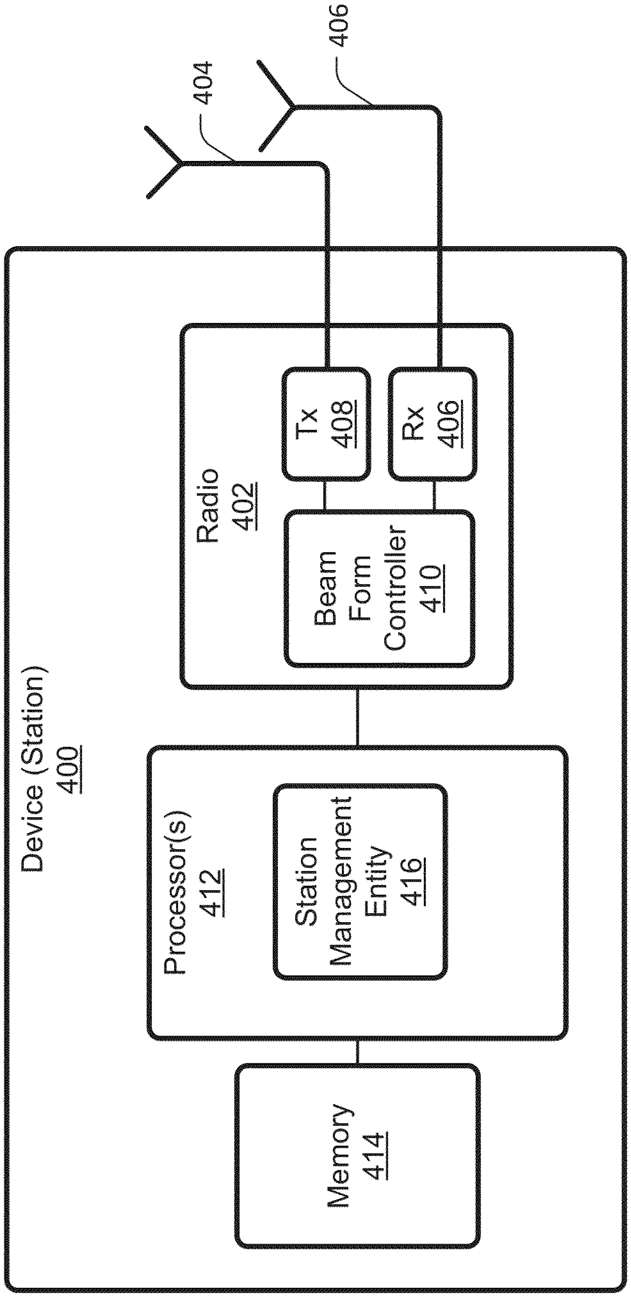
FIG. 4 is a diagram of an example system wireless device.

FIG. 4 shows a schematic illustration of a system wireless device 400 (wireless device 400 may be a station in a network), which may include a laptop computer, a desktop computer, a tablet computer, a docking station, a network interface card, a mobile device, a handheld device, a smart phone or the like as discussed above.

Wireless device 400 may be a wireless communication device that is capable of operating, for example, as: a wireless network controller, an access point, a piconet controller (PNC), a station, a multiband station, a source and/or destination DBand station, an initiator, a responder or the like.

According to some exemplary embodiments of the invention, wireless device 400 may include for example, a radio 402. Radio 402 may be operably coupled to two or more antennas or antenna arrays, such as those described above. For example radio 402 may operably couple to antennas 404 and 406. As discussed above, antennas 404 and 406 may be separate transmit and receive antenna or antenna arrays. Therefore, radio 402 may include at least a transmitter (Tx) 408 and a receiver (Rx) 410. In addition, radio 402 may include a beam forming (BF) controller 410, although the scope of the present invention is not limited in this respect.

Furthermore, according to some embodiments of the invention, radio 402 may operate on the DBand for example, 60 GHz frequency band. Wireless device 400 may further include one or more processors 412 and a memory 414. Processor(s) 412 may include a station management entity (SME) module 416. Processor(s) 414 may operate a MAC protocol according to IEEE 802.11TAGad and/or IEEE 802.15.3c and or WirelessHD™ and/or ECMA-387 and/or ISO/IEC 13156:2009 and/or Bluetooth™ and/or WGA or WiGig specification, if desired.

Memory 414 may include one or more of volatile memory, non-volatile memory, removable or non-removable memory, erasable or non-erasable memory, writeable or rewriteable memory, and the like. For example, memory 414 may include one or more random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In some exemplary embodiments, antennas 404 and 406 may include, for example, phase array antennas, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data, although the scope of the present invention is not limited to these examples.

In some exemplary embodiments of the invention, BF controller 410 may include a multiple-input-multiple-output (MIMO) controller and/or a beam former processor, if desired.

Co-located Antenna Arrays and/or Elements

In certain implementations, in order to improve spatial coverage with antenna arrays and/or antenna array elements radiating in multiple directions, antenna arrays or antenna elements may be co-located on a single platform or plane, such as a board or dielectric material described above.

Such an implementation may be used in mobile wireless devices where notebook computers, tablet computers, hand held devices, etc. The implementation may also be used for stationary communication devices cover multiple radiation directions, such as televisions, set top boxes, APs, residential gateways, etc.

Figure 5:
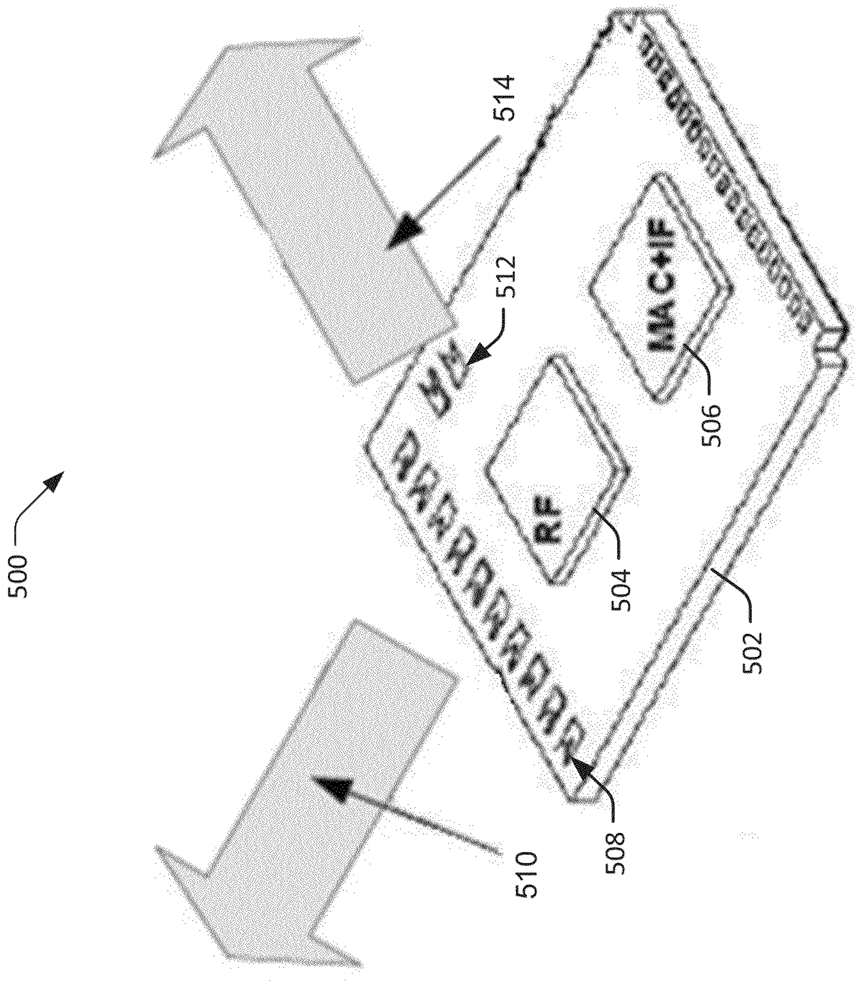
FIG. 5 is a diagram of an example system that includes co-located antenna array elements.

FIG. 5 shows a schematic illustration of a system 500 that includes co-located antenna array elements. Module 502 may include other devices, such as an RF module 504 and MAC+IF module 506. An antenna array that includes ten array elements 508 radiates in the direction 510. On the same module are two antenna array elements 512, residing on the same module 502. The two antenna array elements 512 radiate in a different direction 514. It is contemplated that co-located antenna arrays and elements may operate independent of one another. However, such co-located antenna arrays and elements may operate at the same time.

By co-locating the antennas or antenna arrays, space may be saved, while improving the spatial coverage of the wireless communication device/system. The different antenna arrays are basically independent and radiate in different directions. By co-locating the antennas or antenna arrays on the same module or same board, used space may be reduced, and the antenna arrays and elements fit into smaller form factor devices. This may be particularly useful in devices that are ever decreasing in size.

Conformal Shielding to Form Antennas

Typically, antennas may be external to a package, such as a transceiver, in a device. Certain implementations may place antennas as part of a laminate material, where the laminate material includes a die. Other implementations may provide that the antenna be a separate component integrated into a package.

Conformal shielding may be applied to packages as a shielding process. Conformal shielding is a method of painting/deposition of a thin metallization layer over a molded package to form a shielded package. For example, a radio transceiver may be provided as a die within a conformal shielded package. Selective removal of the conformal shielding may create an antenna structure which integrates the radio transceiver and antenna into the same package. The direct proximity and/or coupling of the die (e.g., radio transceiver) and antenna structure in the package may improve performance since losses are minimized.

As discussed below, different antenna types may be created using metallization removal of the conformal shielding, including “slot”, “slot horn”, “slot patch”, etc. Furthermore, different radiation patterns and radiation directions (i.e., broadside, end-fire) may be provided. With an antenna integrated into such a package, a small form factor may be achieved, which may be used in devices such as cellular telephones and other hand held devices. In addition, various frequencies, such as WiGig 60 GHz frequency may be supported. As discussed above, higher frequency spectrums tend to allow for smaller antennas and smaller packages.

Figure 6A:
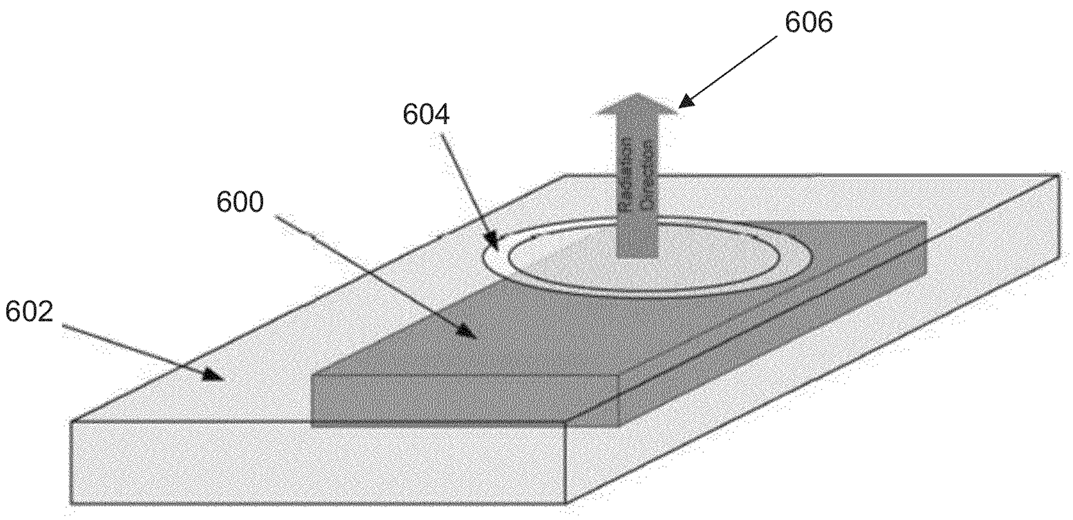
FIG. 6A is a diagram of an example broadside antenna formed with conformal shielding.

FIG. 6A shows a schematic illustration of a broadside antenna formed with conformal shielding. A die 600, such a radio transceiver, is packaged with conformal shielding in a package 602. The metallization of the conformal shielding is selectively removed to create an antenna 604. In this example, the antenna 604 is a patch antenna, and provides for broadside radiation, as represented by directional arrow 606.

Figure 6B:
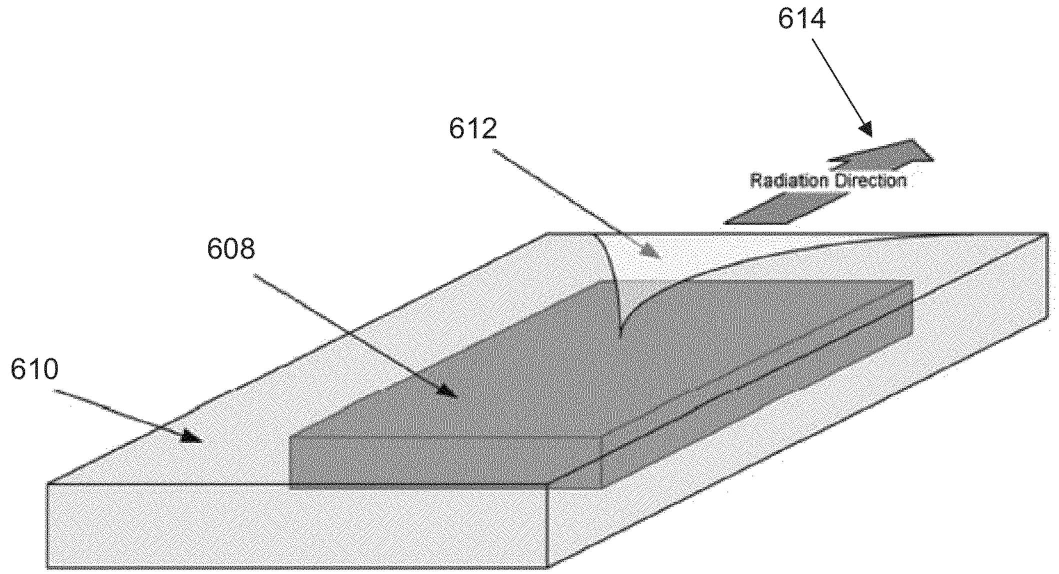
FIG. 6B is a diagram of an example end fire antenna formed with conformal shielding.

FIG. 6B shows a schematic illustration of an end fire antenna formed with conformal shielding. A die 608, such a radio transceiver, is packaged with conformal shielding in a package 610. The metallization of the conformal shielding is selectively removed to create an antenna 612. In this example, the antenna 612 is a slotted horn antenna, and provides for end fire radiation, as represented by directional arrow 614.

Therefore, an external antenna component may be avoided, since the antenna is part of the shielding that is over the die. Furthermore, an antenna feed may directly connect to the die.

Shaped Lens to Enhance Antenna Performance

Devices and wireless devices in particular, may be encased with a plastic or dielectric material to protect internal components, such as circuit boards. Typically, such encased components may include antennas, antenna arrays, and antenna array elements as discussed above. Radio waves that radiate from such antennas, antenna arrays, and antenna array elements maybe be bent and re-bent as they pass plastic or dielectric enclosure material. Although, there may be an associated path loss that is increased due to the radio waves passing through the material, the effective aperture remains the same with or without the material.

Figure 7:
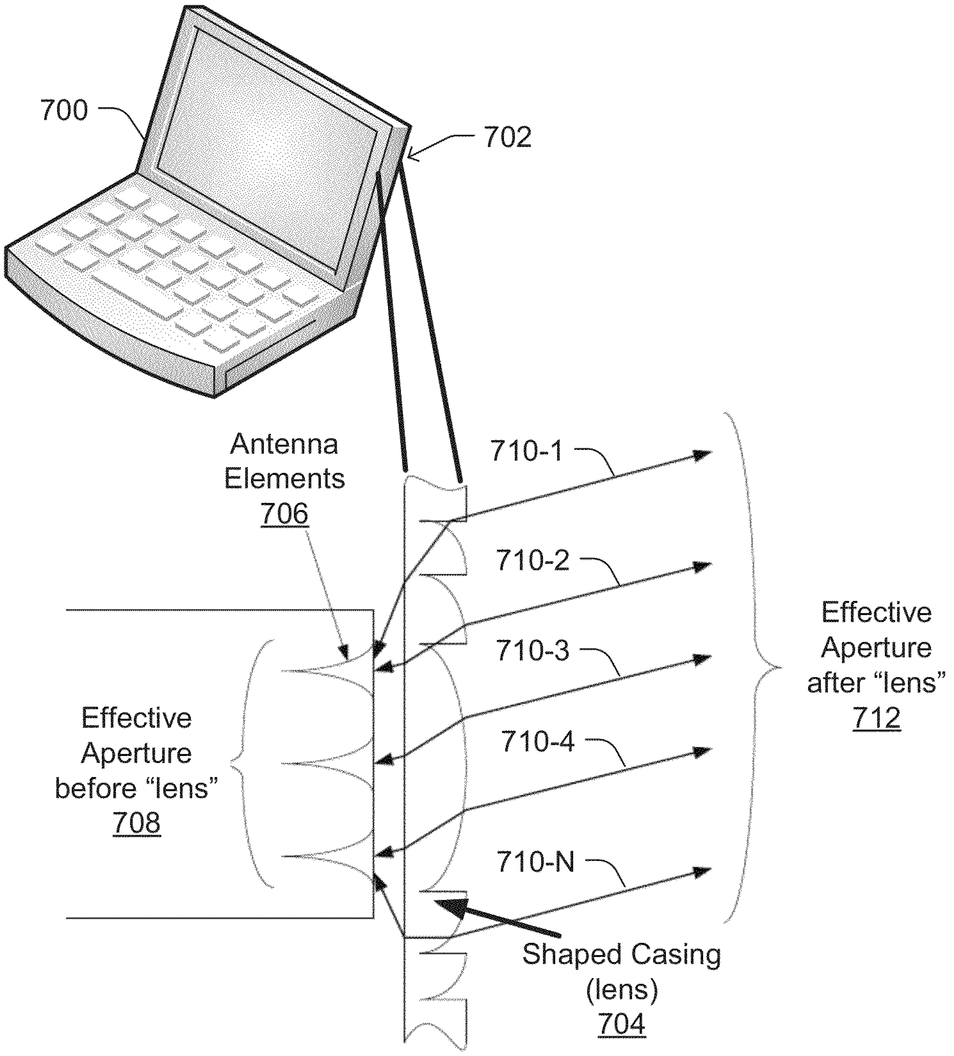
FIG. 7 is a diagram of an example shaped lens to enhance antenna performance.

FIG. 7 shows a schematic illustration of a shaped lens to enhance antenna performance. A wireless device 700 includes an enclosure 702 that may be made of a plastic, dielectric material, or other deformable material to create a shaped lens casing 704. Inside the enclosure 702 are one or more antenna elements 706 having an effective aperture of 708 for respective radio waves 710. The shaped lens casing may effectively increase the antenna aperture size as represented by effective aperture 712. This may focus a larger amount of radio waves into and from a physically smaller antenna. Benefits may include an increase in the effective antenna gain and improve the link budget even though there are still dielectric losses associated with the radio waves passing through the encasing material 702.

Such implementation is may be particularly applied to the devices implementing the WiGig specification and operating in the 60 GHz frequency spectrum. This is in consideration that loses of radio waves passing through encasing material may be more pronounced at relatively higher frequencies such as 60 GHz. Therefore, increasing the effective aperture may help to outweigh the losses through the material when calculating the link budget.

This approach may not limited to the platform case and can also be done at the package or die level when applicable, such as described above. Consideration may be made as to material of the encasing, thickness of the encasing, radio wavelengths, etc.

Example Process

Figure 8:
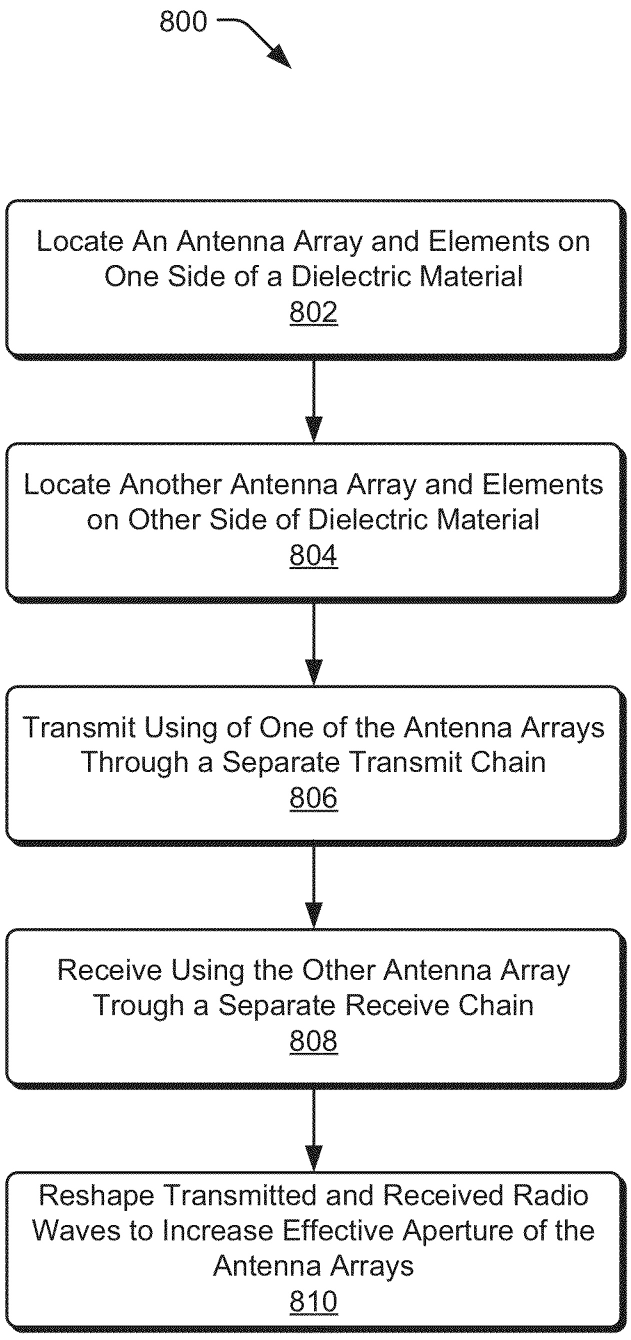
FIG. 8 is an example flow chart for transmitting and receiving with overlapped or staggered antenna arrays.

FIG. 8 shows a flow chart for an exemplary process 800 for transmitting and receiving radio waves using overlapped or staggered antenna arrays. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein.

At block 802, an antenna array and elements are located on one side of a dielectric material. In certain embodiments, the antenna array and elements may share the side or plane of the dielectric material with other antenna arrays and elements. The antenna array and elements, and the other antenna arrays and elements may radiate in same or different directions.

At block 804, another antenna array and elements are located on the other side of the dielectric material. The elements may overlap with elements on the opposite side of the dielectric material. In certain embodiments, the elements may be staggered with element on the opposite side of the dielectric. Staggering and position may be determined based on the possible interference of elements as defined by a spacing of approximately $\lambda/2$ At block 806, transmission of radio waves is performed through a separate transmit chain, using one of the antenna arrays. Transmission may be through a radio operating at the WiGig specification defined 60 GHz.

At block 808, reception of radio waves is performed through a separate receive chain, using one of the antenna arrays. Reception may be through a radio operating at the WiGig specification defined 60 GHz.

At block 810, transmitted and received radio waves are bent to increase effective aperture of the antenna arrays. This may be performed using a shaped lens as described above.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A structure for antenna arrays comprising:

a dielectric material having two planar sides;

a first set of antenna array elements arranged on one side of the dielectric material, wherein the first set of antenna array elements is connected to a transmitter; and a second set of antenna array elements arranged on the other side of the dielectric material opposing the elements of the first set of antenna array elements, wherein the second set of antenna array elements is connected to a receiver.

2. The structure of claim 1 wherein the second set of antenna array elements overlap the elements of the first set of antenna array elements.

3. The structure of claim 1 wherein the second set of antenna array elements are staggered over the elements of the first set of antenna array elements.

4. The structure of claim 1 wherein the elements of the first and second antenna arrays are spaced from one another by a distance of $\lambda/2$.

5. The structure of claim 4 wherein $\lambda$ is defined by a 60 GHz operating frequency.

6. The structure of claim 1 wherein the first set of antenna array elements is part of a transmit chain, and the second set of antenna array elements are part of a receive chain.

7. The structure of claim 1 wherein antenna arrays of the first and second sets of antenna array elements operate at 60 GHz.

8. The structure of claim 1 wherein the antenna array elements are shaped using a conformal shielding process.

9. The structure of claim 1 wherein the antenna array elements are part of broadside or end fire antenna arrays.

10. The structure of claim 1 wherein radio waves of the antenna array elements are bent in order to increase effective aperture of the elements.

11. The structure of claim 1 further comprising other antenna array elements that radiate in different directions placed on either or both sides of the structure.

12. A device comprising:

one or more processors; and a radio configured to the one or more processors that includes:

a transmitter connected to a first antenna array having multiple elements arranged on one side of a dielectric material, and a receiver connected to a second antenna array having multiple elements arranged on the other side of the dielectric material.

13. The device of claim 12 wherein the elements on either side of dielectric material are arranged overlapping opposing elements.

14. The device of claim 12 wherein the elements on either side of the dielectric material are arranged in a staggered arrangement from opposing elements.

15. The device of claim 12 wherein the elements are arranged to be spaced by a distance of $\lambda/2$ from one another.

16. The device of claim 12 wherein the antenna elements are part of package that includes either or both of the transmitter and receiver, and are formed using conformal shielding.

17. The device of claim 12 wherein the device operates at 60 GHz.

18. The device of claim 12 further comprising an encasing that is shaped to bend transmitted and received radio waves to increase effective aperture of the elements.

19. The device of claim 12 further comprising co-located antenna elements and/or arrays to increase spatial coverage.

20. A method of transmitting and receiving radio waves comprising:

locating a first antenna array and elements on one side of a dielectric material;

locating a second antenna array and elements on the other side of the dielectric material;

transmitting using the first antenna array and elements through a transmit chain; and receiving using the second antenna array and elements through a receive chain.

21. The method of claim 20 further comprising reshaping transmitted and received radio waves to increase effective aperture of the antenna array.

22. The method of claim 20 further comprising co-locating antenna arrays and/or elements to increase special coverage.

* * * * *